(12) United States Patent
Kerselaers (10) Patent No.: US 10,277,267 B1
(45) Date of Patent: Apr. 30, 2019

(54) ANTENNA TUNING DEVICE

(71) Applicant: NXP B.V., Eindhoven (NL)

(72) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/900,873

(22) Filed: Feb. 21, 2018

(51) Int. Cl.
| H04B 17/14 | (2015.01) |
| H04B 17/24 | (2015.01) |
| H04W 24/08 | (2009.01) |
| H01Q 9/04  | (2006.01) |
| H04B 1/40  | (2015.01) |
| H04B 17/12 | (2015.01) |

(52) U.S. Cl.
CPC .............. H04B 1/40 (2013.01); H04B 17/12 (2015.01); H04B 17/14 (2015.01)

(58) Field of Classification Search
CPC .......... H04B 1/40; H04B 17/12; H04B 17/20; H04B 17/24; H01Q 7/005; H01Q 9/0442; H01Q 13/103; H04W 24/08
See application file for complete search history.

(56) References Cited

U.S. PATENT DOCUMENTS

| 5,491,715 | A   | 2/1996  | Flaxl |
| 7,689,193 | B2  | 3/2010  | Lester et al. |
| 8,391,817 | B2  | 3/2013  | Noel |
| 2014/0044021 | A1* | 2/2014 | Alberth, Jr. ............. H04B 1/18 370/278 |
| 2014/0210685 | A1* | 7/2014 | Chang ................... H01Q 1/243 343/861 |
| 2014/0323065 | A1* | 10/2014 | Lei ......................... H01Q 1/243 455/77 |
| 2017/0170564 | A1* | 6/2017 | Velandia Torres ..... H01Q 7/005 |
| 2017/0288790 | A1* | 10/2017 | Haub ...................... H04B 17/14 |
| 2017/0310008 | A1* | 10/2017 | White ..................... H03H 7/40 |
| 2017/0365926 | A1* | 12/2017 | Kishimoto .............. H04B 1/04 |

* cited by examiner

Primary Examiner — Andrew Wendell (57) ABSTRACT

One example discloses an antenna tuning device, including: a controller configured to be coupled to a transceiver having an antenna tuner; wherein the transceiver is coupled to an antenna; wherein the controller is configured to receive a measured current signal from the transceiver corresponding to a current sent to or received by the antenna; and wherein the controller is configured to change an impedance of the antenna tuner in response to the measured current signal.

19 Claims, 8 Drawing Sheets

ANTENNA TUNING DEVICE

The present specification relates to systems, methods, apparatuses, devices, articles of manufacture and instructions for antenna tuning.

SUMMARY

According to an example embodiment, an antenna tuning device, comprising: a controller configured to be coupled to a transceiver having an antenna tuner; wherein the transceiver is coupled to an antenna; wherein the controller is configured to receive a measured current signal from the transceiver corresponding to a current sent to or received by the antenna; and wherein the controller is configured to change an impedance of the antenna tuner in response to the measured current signal.

In another example embodiment, the transceiver includes an amplifier and the measured current signal corresponds to at least one of: a current received by the amplifier, a current internal to the amplifier, or a current output by the amplifier.

In another example embodiment, the transceiver is configured to receive from the antenna or transmit to the antenna a communications signal; and the controller is configured to optimize transmission or reception of the communications signal in response to the measured current signal.

In another example embodiment, the transceiver is configured to receive from the antenna or transmit to the antenna a communications signal; and the controller is configured to center the communications signal about a resonant frequency of the antenna by changing the impedance of the antenna tuner in response to the measured current signal.

In another example embodiment, the controller is configured to transmit a test signal to the antenna; the measured current signal received by the controller is based on the test signal; and the controller is configured to not change the impedance of the antenna tuner if the measured current signal equals a predetermined current.

In another example embodiment, the antenna has a parallel topology and the predetermined current is a maximum current.

In another example embodiment, the antenna has a series topology and the predetermined current is a minimum current.

In another example embodiment, the controller is configured to transmit a test signal to the antenna; the measured current signal received by the controller is based on the test signal; and the controller is configured to change the impedance of the antenna tuner if the measured current signal does not equal a predetermined current.

In another example embodiment, the controller is configured to transmit two test signals at two different frequencies to the antenna; two measured current signals are received by the controller corresponding to the two test signals; and the controller is configured to change the impedance of the antenna tuner if the two measured current signals are not substantially equal.

In another example embodiment, the antenna has a parallel topology and a resonant frequency; the controller is configured to transmit a test signal at the resonant frequency and a test signal offset from the resonant frequency; and the controller is configured to change the impedance of the antenna tuner if a measured current of the offset test signal is either equal to or greater than a measured current of the resonant frequency test signal.

In another example embodiment, the antenna has a series topology and a resonant frequency; the controller is configured to transmit a test signal at the resonant frequency and a test signal offset from the resonant frequency; and the controller is configured to change the impedance of the antenna tuner if a measured current of the offset test signal is either equal to or less than a measured current of the resonant frequency test signal.

In another example embodiment, the antenna has a resonant frequency; the controller is configured to transmit a first test signal at the resonant frequency, a second test signal having a frequency greater than the resonant frequency, and a third test signal having a frequency less than the resonant frequency; three measured current signals are received by the controller corresponding to the three test signals; and the controller is configured to change the impedance of the antenna tuner if the measured current signals from the second and third test signals are not substantially equal.

In another example embodiment, the antenna is at least one of: a near field antenna, a wireless antenna, or an RF antenna.

In another example embodiment, the antenna tuner includes a variable reactance; and the controller is configured to change the variable reactance of the antenna tuner in response to the measured current signal.

In another example embodiment, further comprising a current sensor configured to measure the current sent to or received by the antenna; and wherein the controller is configured to receive the measured current signal from the current sensor.

In another example embodiment, the measured current signal corresponds to an antenna source current.

In another example embodiment, the antenna tuning device is embedded within at least one of: an earbud, a hearing aid, a smart watch, a body network device, or a medical device.

According to an example embodiment, a parallel topology antenna device, comprising: a controller configured to be coupled to a transceiver having an antenna tuner; wherein the transceiver is coupled to an antenna; wherein the controller is configured to receive a measured current signal from the transceiver corresponding to a current sent to or received by the antenna; wherein the controller is configured to change an impedance of the antenna tuner in response to the measured current signal; wherein the antenna has a resonant frequency; wherein the controller is configured to transmit a test signal at the resonant frequency and a test signal offset from the resonant frequency; and wherein the controller is configured to change the impedance of the antenna tuner if a measured current of the offset test signal is either equal to or greater than a measured current of the resonant frequency test signal.

According to an example embodiment, a series topology antenna device, comprising: a controller configured to be coupled to a transceiver having an antenna tuner; wherein the transceiver is coupled to an antenna; wherein the controller is configured to receive a measured current signal from the transceiver corresponding to a current sent to or received by the antenna; wherein the controller is configured to change an impedance of the antenna tuner in response to the measured current signal; wherein the antenna has a resonant frequency; wherein the controller is configured to transmit a test signal at the resonant frequency and a test signal offset from the resonant frequency; and wherein the controller is configured to change the impedance of the antenna tuner if a measured current of the offset test signal is either equal to or less than a measured current of the resonant frequency test signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Antennas, both near-field and RF, are used in a wide range of wireless devices and best operate when they are tuned to their optimal (e.g. resonant) frequencies within their operating band.

Regarding the different types of wireless communication options, RF communication is accomplished by propagating an RF plane wave through free space, near-field communication utilizes non-propagating quasi-static fields. The quasi-static characteristic of the fields is the result of antenna dimensions in combination with the carrier frequency. Most the energy is stored in the form of magnetic and electric fields and a small amount of RF energy inevitably propagates in free space.

Small antenna geometries compared with the carrier wavelength however are candidate for near-field communication since they do not generate radiating waves in free space. Among these antennas, some react dominantly on the magnetic field. This is the case with loop antennas, made by of a coil that is usually put into resonance using capacitors. Such an antenna allows near-field magnetic induction, NFMI.

Other antennas, or combination of antennas react on both magnetic and electric field. This is the case with short monopole or dipole antennas combination with a coil. Such antennas are usually put into resonance with capacitors. Such combination of antennas allows near-field magnetic and electric induction, NFEMI, communication.

Wireless communications devices may be included in hearing aids, earbuds, body area networks, smartphones and so on.

Figure 1:
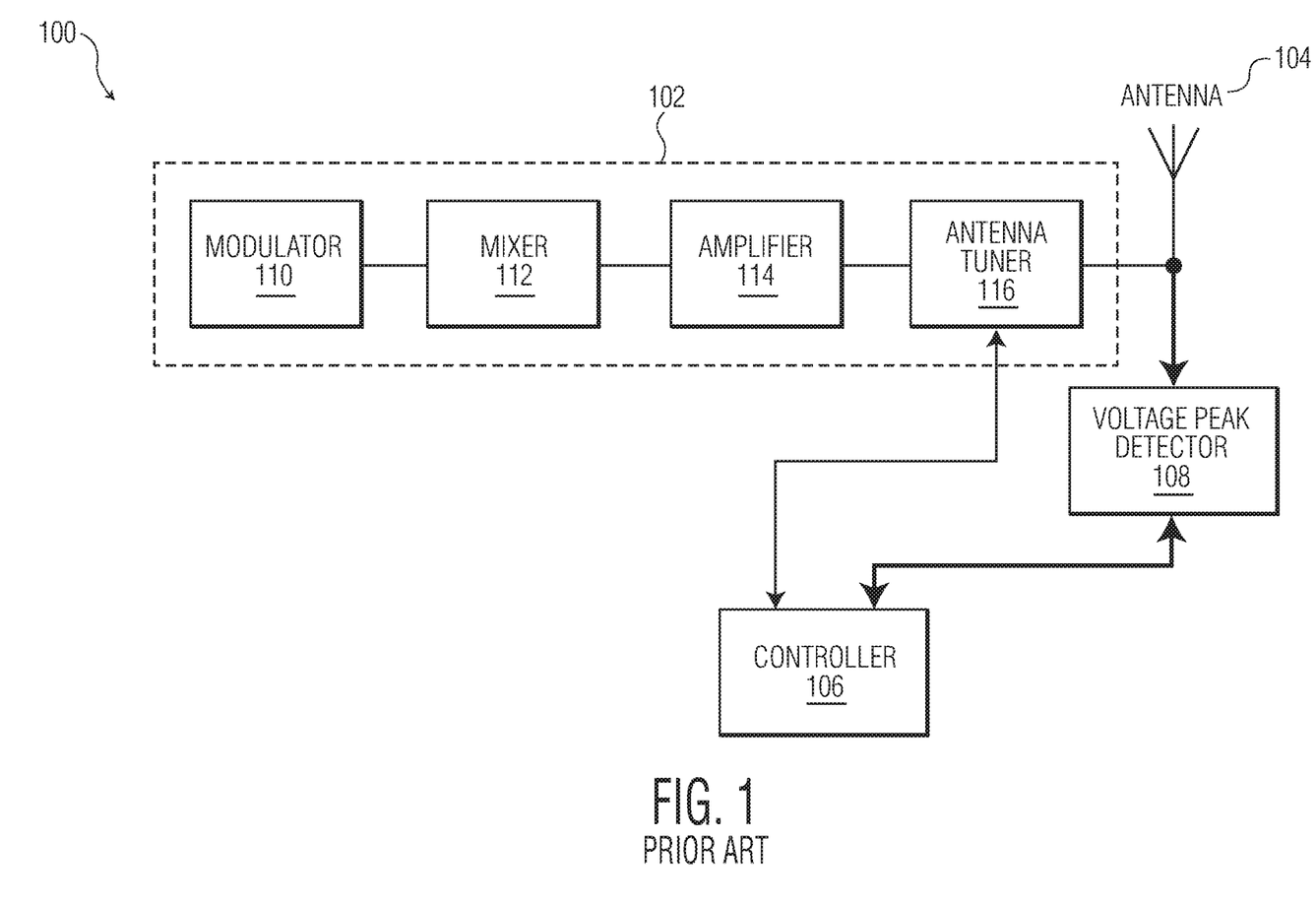
FIG. 1 is an example of a parallel resonant antenna tuning device.

FIG. 1 is an example 100 of a parallel resonant antenna tuning device. The example 100 parallel resonant antenna tuning device includes a transceiver 102, an antenna 104, a controller 106, and a voltage peak detector 108. The transceiver 102 includes a modulator/demodulator 110, a mixer 112, an amplifier 114, and an antenna tuner 116.

Figure 2:
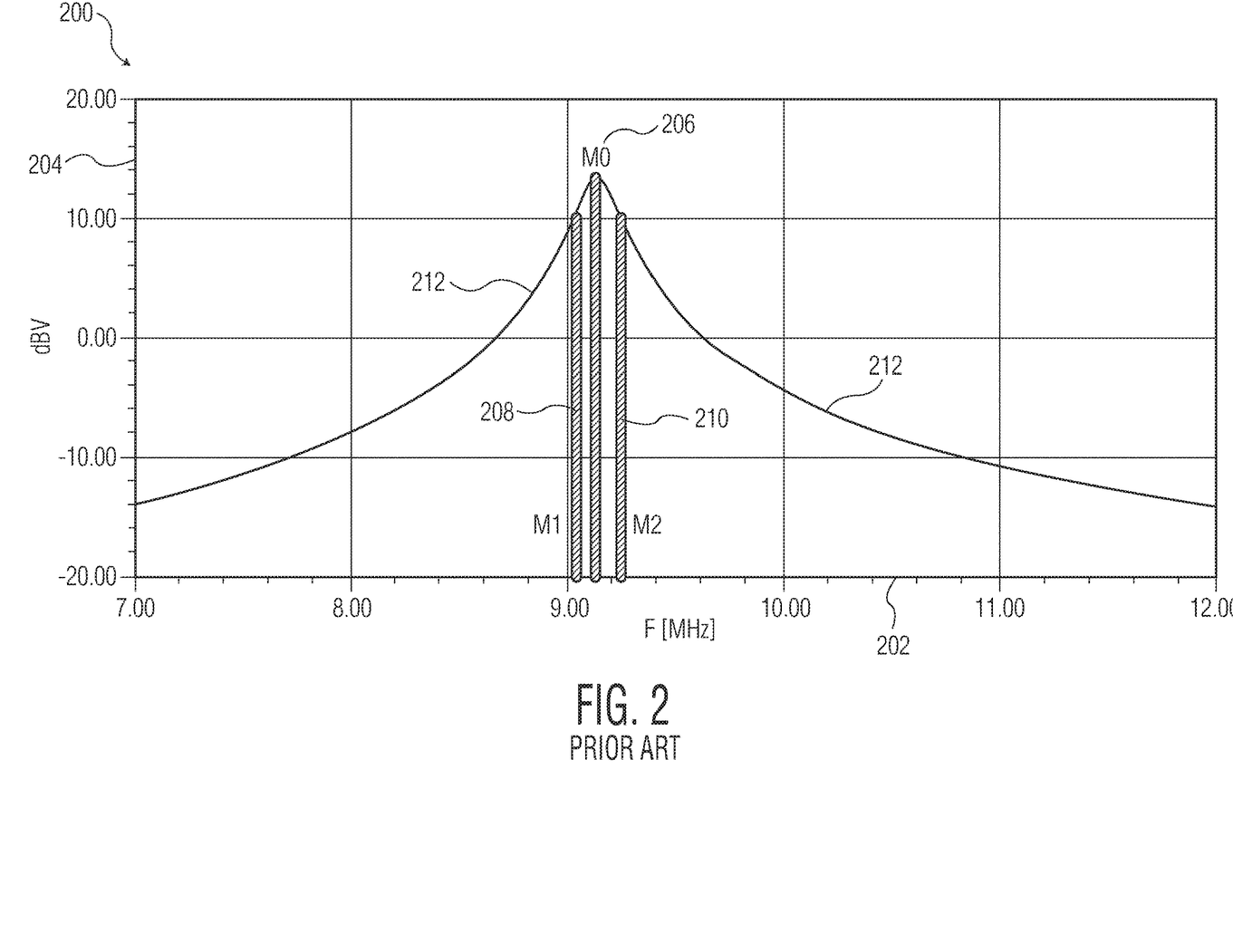
FIG. 2 is an example graph of voltage verses frequency for a parallel resonant antenna.

The antenna 104 voltage is measured by the voltage peak detector 108 and used for determining resonance of the antenna as discussed in FIG. 2. Some of these antenna systems are based on RLC circuits where the bandwidth of the antenna can be adjusted using resistive elements while the resonance frequency can be adjusted by changing values of reactive components. For example a magnetic antenna coil can be aligned to resonance with a variable capacitor.

FIG. 2 is an example 200 graph of voltage verses frequency for a parallel resonant antenna. The example graph 200 shows a frequency axis 202, a voltage axis 204 (dBV), a first voltage measurement (M0) 206, a second voltage measurement (M1) 208, a third voltage measurement (M2) 210, and a resonant envelope 212 of the transceiver 102 antenna 104 combination.

The controller 106 is configured to cause the transceiver 102 to sequentially inject at least three different frequencies (M0, M1 and M2) into the antenna 104. These frequencies are pre-selected based on a set of transmission and reception characteristics for the antenna 104 transceiver 102 combination and other devices (not shown) that will be communicated with.

M0 is the reference frequency at which the antenna 104 transceiver 102 combination should be resonant. M1 and M2 are frequencies having a preselected offset from the reference frequency M0. The voltage peak detector 108 measures the voltage on the antenna at each of the frequencies. These voltages correspond to measurements M0, M1 and M2 shown in FIG. 2.

M1 and M2 are measured at a predefined frequency difference from M0, for example 100 KHz. This offset has to be in the frequency band of operation, for example within 500 KHz. For an equivalent parallel resonance antenna type circuit, the resonance frequency of the antenna is found at the voltage maximum, M0.

The transceiver 102 (e.g. radio) contains an integrated capacitor bank that is used to align the transceiver 102 with a resonance frequency of the antenna 104. This can be done by measuring sequentially the voltages M0, M1 and M2 and comparing them with each other.

Depending on the values and sign of M1 and M2 relative to M0, it can be concluded that the resonance frequency of the antenna is too low or too high and corrective action with the capacitor bank is required to align the voltage of M1 and M2 within a certain tolerance and with the same sign.

A tuning tolerance is based on a voltage measuring accuracy for a giving alignment time. For example, the tolerance in some examples can be within +/−1 dB. For example, if the carrier frequency of the system is 9.1 MHz, the required antenna operational bandwidth is 200 KHz, and the equivalent schematic of the antenna system is of the parallel resonance type, then the frequencies used for the antenna alignment are 9 and 9.2 MHz. For such specifications, the antenna can be aligned since the voltage at 9 and 9.2 MHz are 3 dB lower compared with the voltage at the resonance frequency.

The example 100 device however requires relatively high voltages and a lot of power for the voltage peak detector 108 to operate effectively. The tuning process may also generate unwanted interference in other devices. The voltage peak detector 108 also creates parasitic loads on the antenna 104 that can introduce digital bit errors and/or non-linear analog signal distortions. These undesired harmonic spurious signals are injected into communications signals, due to the non-linear characteristics of a diode voltage peak detector. Such voltage peak detectors 108 also tend to work only for parallel resonant type of antennas, since series resonant circuits have very low, almost undetectable, voltages at their resonance.

Now discussed is an antenna tuning device for tuning either a series or parallel resonance type antenna. The antenna tuning device measures a current transmitted or received from an antenna, and adjusts a variable impedance (e.g. reactance) to optimize signal transmission or reception from the antenna (e.g. align the antenna to its resonance frequency).

In some example embodiments, the antenna tuning device configures a transceiver coupled to the antenna to sequentially transmit/inject signals at three different frequencies within the antenna's operational bandwidth. One or more of the transceiver's source currents which correspond to the three different frequency signals, are then sequentially measured.

Depending upon the measurements, a controller is configured to adjust an impedance (e.g. reactance) component in the transceiver such that the antenna is brought back into resonance. The antenna tuning device now to be discussed is also applicable to both parallel and series resonant antenna systems having varying frequencies and transmission characteristics (e.g. RF, NFEMI, NFMI, etc.).

Furthermore, in some example embodiments to be discussed, antenna tuning can be done while the antenna is still transmitting and/or receiving normal communication traffic. In contrast, a non-linear voltage peak detector circuit would tend to distort the communications traffic and create digital errors or analog distortions.

Figure 3A:
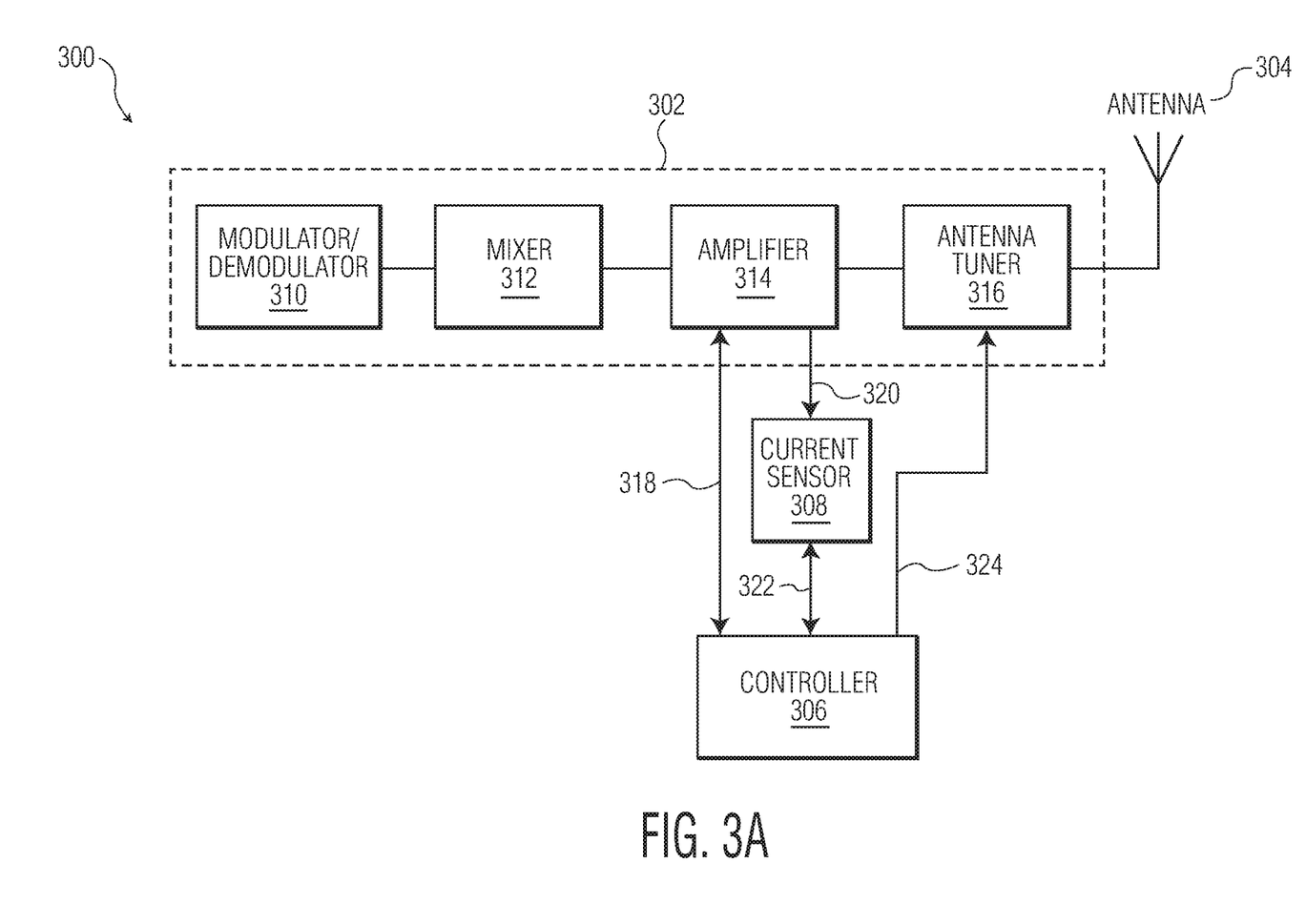
FIG. 3A is a first example of a series and/or parallel resonant antenna tuning device.

FIG. 3A is a first example 300 of a series and/or parallel resonant antenna tuning device. The first example 300 includes a transceiver 302, an antenna 304, a controller 306, and a current sensor 308. The transceiver 302 includes a modulator/demodulator 310, a mixer 312, an amplifier 314, and an antenna tuner 316. The controller 306 communicates with these various elements with line 318 (e.g. an amplifier control signal), line 320 (e.g. one or more current sense signals), line 322 (e.g. sensor control signal), and line 324 (e.g. impedance control signal).

In various example embodiments the antenna 304 is at least one of: a near field antenna, a wireless antenna, or an RF antenna.

The controller 306 is coupled to the transceiver 302 and the transceiver 302 is coupled to the antenna 304. The controller 306 is configured to receive a measured current signal from the transceiver 302 corresponding to a current sent to or received by the antenna 304.

Figure 3B:
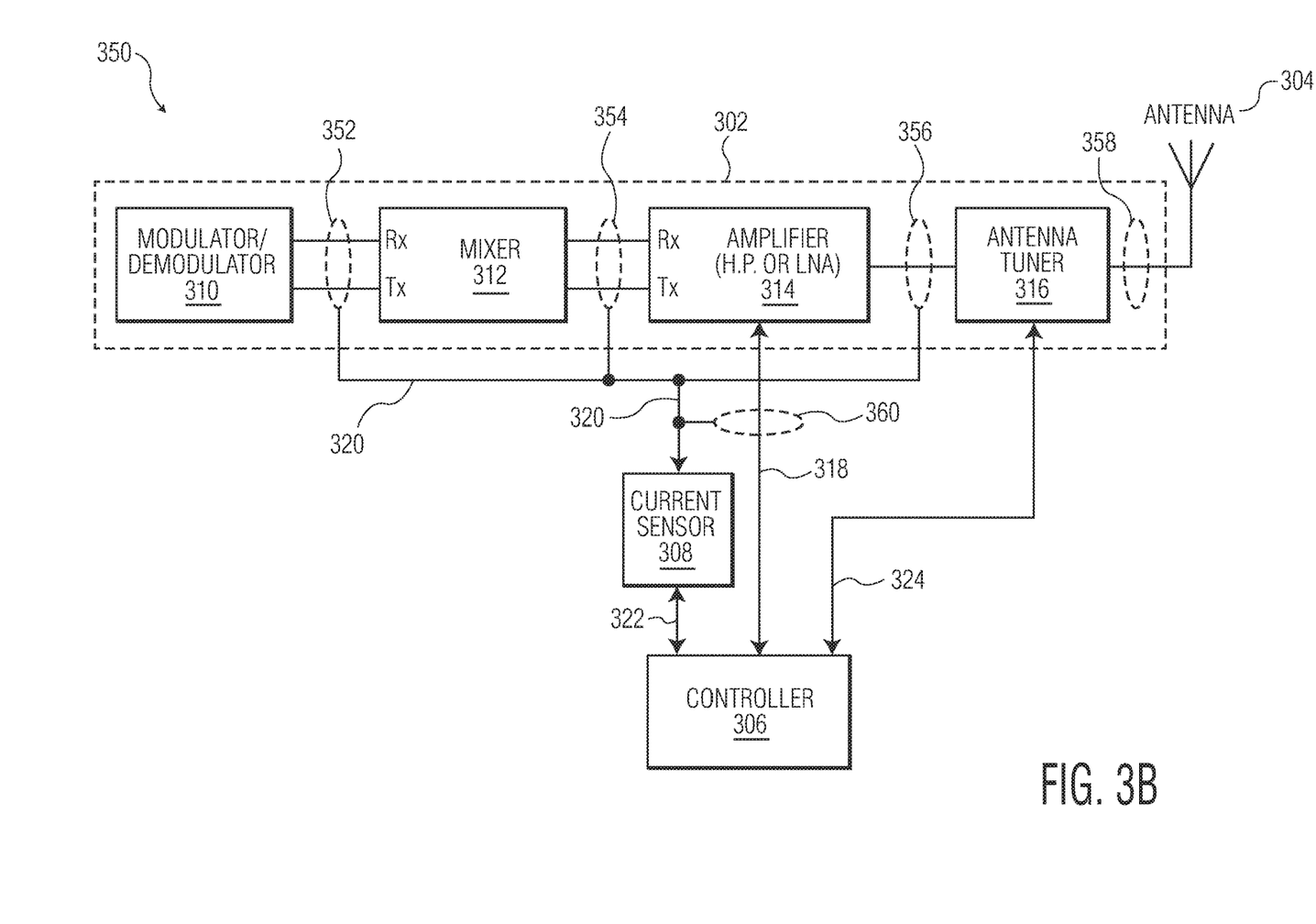
FIG. 3B is a second example of the series and/or parallel resonant antenna tuning device.

The measured current signal in some example embodiments corresponds to at least one of: a current received by the amplifier 314, a current internal to the amplifier 314, or a current output by the amplifier 314. Additional measured currents are possible, as shown in FIG. 3B. In various example embodiments, the amplifier 314 is a high power (H.P.) amplifier for transmitting (Tx) signals and a low noise amplifier (LNA) for receiving (Rx) signals.

The current sensor 308 can be configured to measure one or more currents sent to or received from the antenna 304, and the controller 306 is configured to receive the measured current signal from the current sensor 308.

The controller 306 changes an impedance of the antenna tuner 316 in response to the measured current signal. The antenna tuner 316 can include a variable reactance; and the controller 306 is configured to change the variable reactance of the antenna tuner 316 in response to the measured current signal.

The transceiver 302 is configured to receive from the antenna 304 or transmit to the antenna 304 a communications signal. The controller 306 in one example embodiment optimizes the transmission or reception of the communications signal in response to the measured current signal. The controller 306 in another example embodiment centers the communications signal about a resonant frequency of the antenna 304 by changing the impedance of the antenna tuner 316 in response to the measured current signal.

In some example embodiments the controller 306 is configured to transmit a test signal (e.g. M10, M11, or M12) to the antenna 304. While a general discussion of test signal injection, current measurement, and impedance tuning is now discussed, various other scenarios involving multiple test signals are presented and discussed in FIGS. 4, 5, 6 and 7.

The measured current signal received by the controller 306 is based on the test signal. In some example embodiments the controller 306 is configured to not change the impedance of the antenna tuner 316 if the measured current signal equals a predetermined current, but is configured to change the impedance of the antenna tuner 316 if the measured current signal does not equal a predetermined current.

For example, if the antenna 304 has a parallel topology, the predetermined current can be a maximum current. If the antenna 304 has a series topology, the predetermined current can be a minimum current.

In other example embodiments the controller 306 is configured to transmit two test signals at two different frequencies to the antenna 304. Two measured current signals are then received by the controller 306 corresponding to the two test signals. The controller 306 can be configured to change the impedance of the antenna tuner 316 if the two measured current signals are not substantially equal.

In those example embodiments where the antenna 304 has a parallel topology and a resonant frequency, the controller 306 can then be configured to transmit a test signal at the resonant frequency and a test signal offset from the resonant frequency. The controller 306 could then be configured to change the impedance of the antenna tuner 316 if a measured current of the offset test signal is either equal to or greater than a measured current of the resonant frequency test signal.

However, in those example embodiments where the antenna 304 has a series topology and a resonant frequency, the controller 306 can be configured to transmit a test signal at the resonant frequency and a test signal offset from the resonant frequency. The controller 306 then changes the impedance of the antenna tuner 316 if a measured current of the offset test signal is either equal to or less than a measured current of the resonant frequency test signal.

In some example embodiments the antenna 304 the controller 306 is configured to transmit three test signals at three different frequencies to the antenna 304 (See FIGS. 4, 5, 6 and 7 below for examples). The first test signal could be transmitted at the resonant frequency, the second test signal at a frequency greater than the resonant frequency, and the third test signal at a frequency less than the resonant frequency.

Three measured current signals would then be received by the controller 306 corresponding to the three test signals. The controller 306 could be configured to change the impedance of the antenna tuner 316 if the measured current signals from the second and third test signals are not substantially equal. Other optimization configurations are possible.

In some example embodiments the antenna tuning device 300 is embedded within at least one of: an earbud, a hearing aid, a smart watch, a body network devices, or a medical device.

FIG. 3B is a second example 350 of the series and/or parallel resonant antenna tuning device. The second example 350 series or parallel resonant antenna tuning device includes the elements of the first example 300 device, however one or more current sense signals on line 320 can be collected from current sense point 352, current sense point 354, current sense point 356, current sense point 358, and/or current sense point 360. In some example embodiments, current sense points 352 and 354 are in the receive path since they may not directly be influenced by the antenna resonance but by the signal strength.

Figure 4:
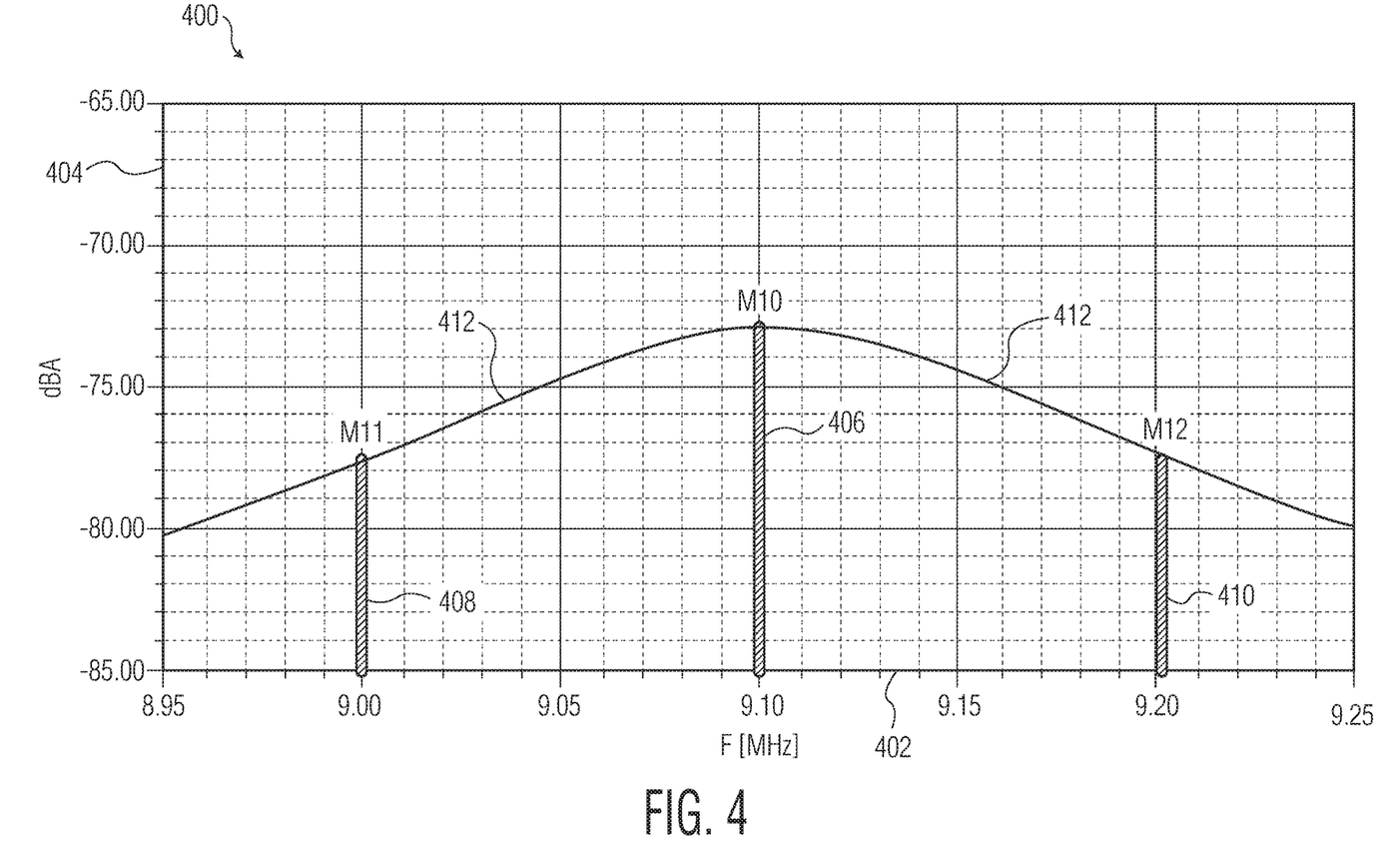
FIG. 4 is a first example graph of current verses frequency for a parallel resonant antenna.
Figure 5:
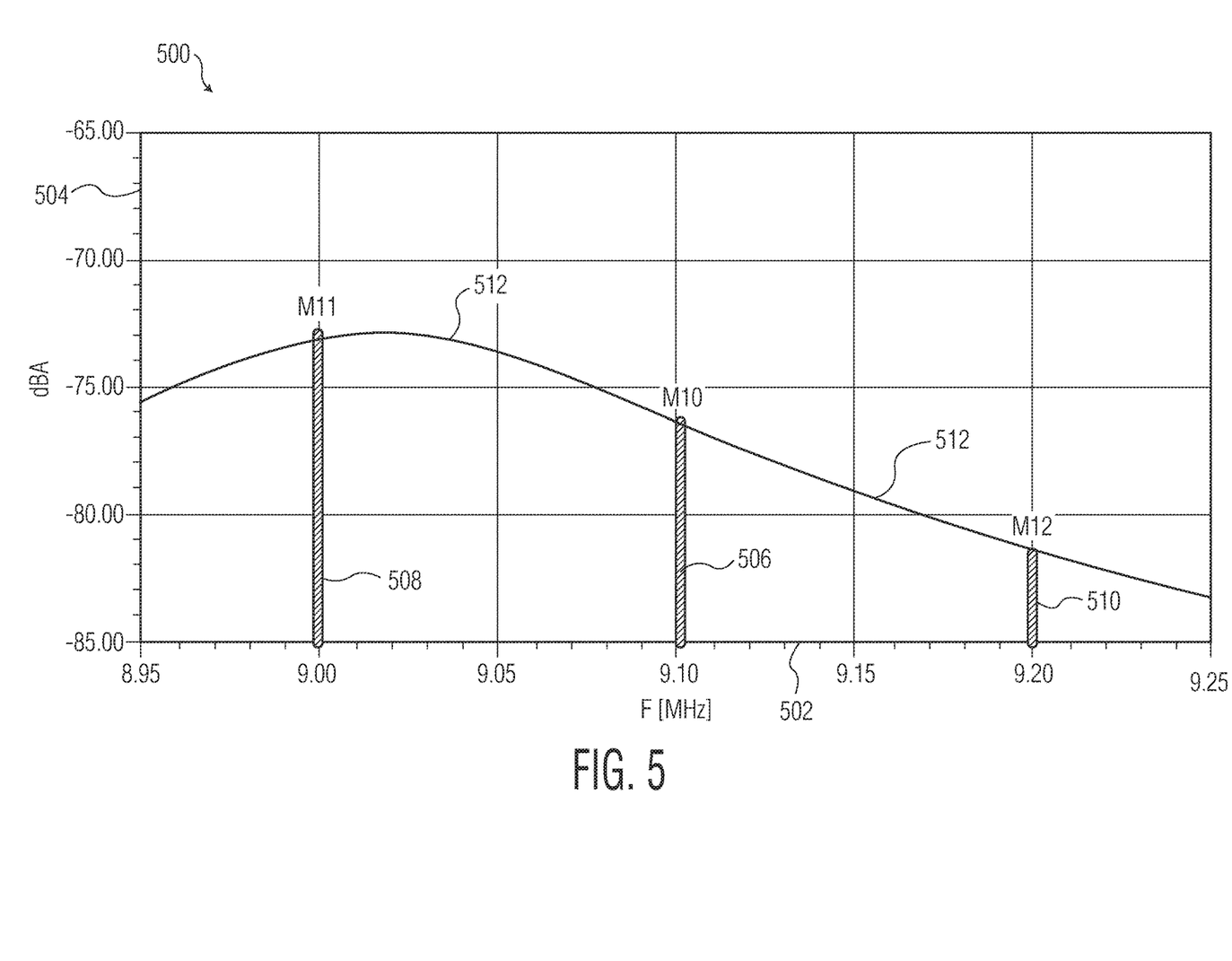
FIG. 5 is a second example graph of current verses frequency for a parallel resonant antenna.
Figure 6:
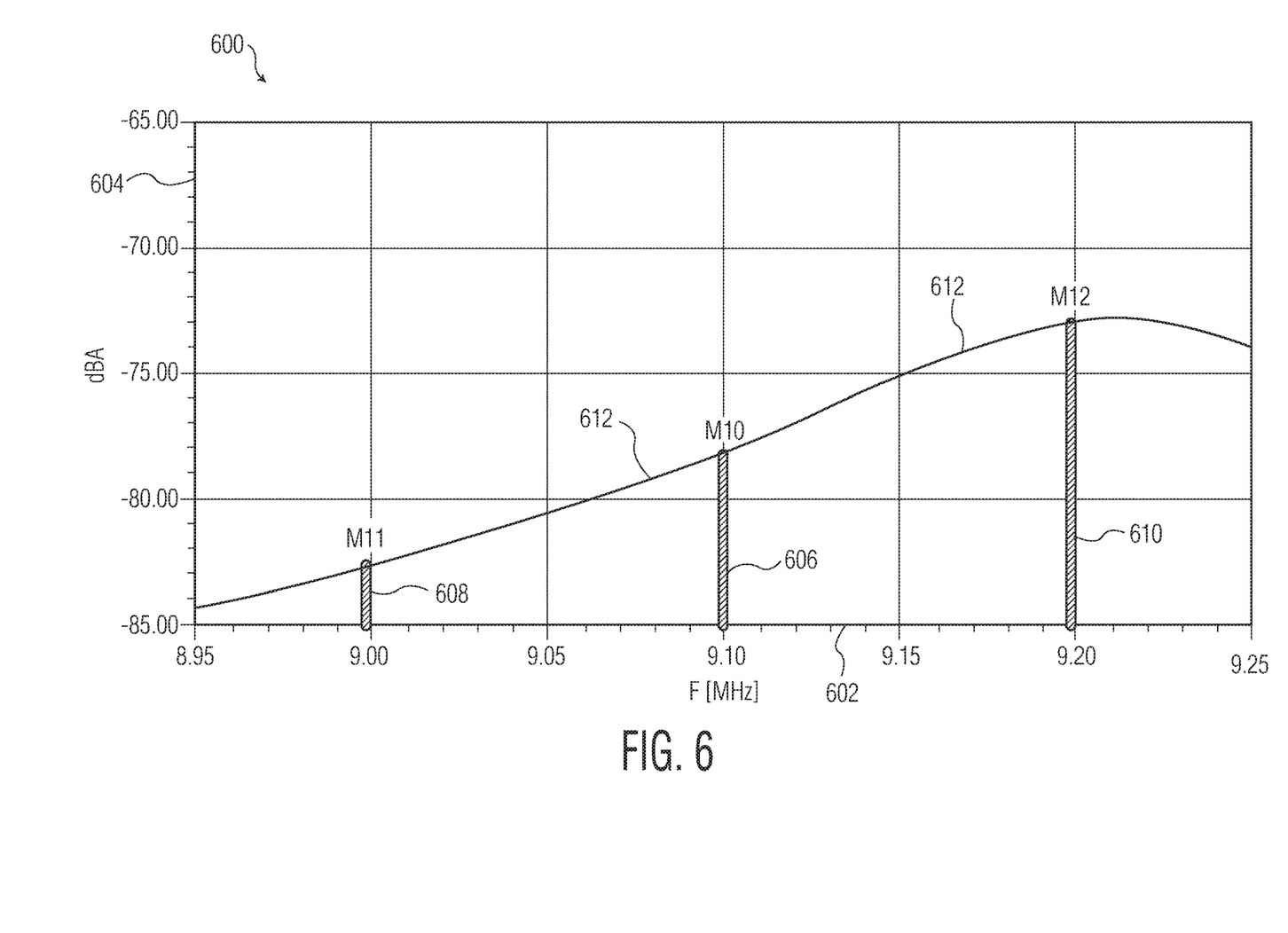
FIG. 6 is a third example graph of current verses frequency for a parallel resonant antenna.

FIGS. 4, 5, and 6 are example graphs of current verses frequency for a parallel resonant antenna 304 in various stages of resonant alignment (e.g. tuning) based on antenna 304 transceiver 302 path currents.

FIG. 4 is a first example graph 400 of current verses frequency for an optimally aligned parallel resonant antenna. The example graph 400 shows a frequency axis 402, a current axis 404 (dBA), a first current measurement (M10) 406, a second current measurement (M11) 408, a third current measurement (M12) 410, and a transceiver 302 antenna 304 resonant envelope 412.

In this example, the antenna 304 is having an equivalent parallel resonant topology. The controller 306 is configured to sequentially inject three different frequencies (M0, M1 and M2) into the transceiver 302. These frequencies are pre-selected based on a set of transmission and reception characteristics for the antenna 304 transceiver 302 combination and other devices (not shown) that will be communicated with.

M0 is the reference frequency at which the antenna 304 transceiver 302 combination should be resonant. M1 and M2 are frequencies having a preselected offset from the reference frequency M0 and are used for tuning purposes, as discussed below.

The transceiver 302 antenna 304 transmitted or received current is measured at each of the injected frequencies M10, M11 and M12.

M10 shows a maximum current that belongs to the resonance frequency of the antenna 304. M11 and M12 are separated by a frequency offset of each 100 KHz from M10. The impedance (e.g. reactance, variable capacitor, etc.) of the antenna tuner 316 is set for M11 and M12 have the same sign (relative to M10) and are within a certain tolerance of each other.

In some example embodiments, the tolerance is determined by measuring accuracy that is possible and alignment time. For example, the tolerance is within +/−1 dB. In this example, the radio contains an integrated capacitor bank that is used to align the resonance frequency of the antenna 304 system. In some example embodiments, the bandwidth of the antenna 304 is adjusted using resistive elements and the resonance frequency is adjusted using variable reactance components (e.g. variable capacitors).

Antenna 304 tuning can be based on an absolute difference between the three measured current amplitudes, a relative difference (e.g. plus/minus) between two or more of the measured current amplitudes, or a combination of both. Once this difference is known the controller 306 can adjust the impedance (e.g. reactance) of the antenna tuner 316 in one or two iterations of this frequency injecting, current measuring and impedance tuning procedure.

FIG. 5 is a second example graph 500 of current verses frequency for a less than optimally aligned parallel resonant antenna. Example graph 500 shows a frequency axis 502, a current axis 504 (dBA), a first current measurement (M10) 506, a second current measurement (M11) 508, a third current measurement (M12) 510, and a transceiver 302 antenna 304 resonant envelope 512.

In this example embodiment the antenna 304 has a resonance frequency that is too low (i.e. shifted to the left on the frequency axis 502 in FIG. 5). It can be seen in FIG. 5 that the currents at M11 and M12 have opposite signs with respect to M10. This causes the controller 306 to incrementally increase the impedance (e.g. variable capacitance) on the antenna 304 by adjusting the antenna tuner 316. This optimization process can be repeated to further optimize the transmission and reception of signals by the transceiver 302 antenna 304 system.

FIG. 6 is a third example graph 600 of current verses frequency for another less than optimally aligned parallel resonant antenna. Example graph 600 shows a frequency axis 602, a current axis 604 (dBA), a first current measurement (M10) 606, a second current measurement (M11) 608, a third current measurement (M12) 610, and a transceiver 302 antenna 304 resonant envelope 612.

In this example embodiment the antenna 304 has a resonance frequency that is too high (i.e. shifted to the right on the frequency axis 602 in FIG. 6). It can be seen in FIG. 6 that the currents at M11 and M12 have opposite signs with respect to M10. This causes the controller 306 to incrementally increase the variable capacitance on the antenna 304 in an attempt to bring the antenna 304 to resonance. After this step the antenna 304 source currents are measured again and evaluated.

Figure 7:
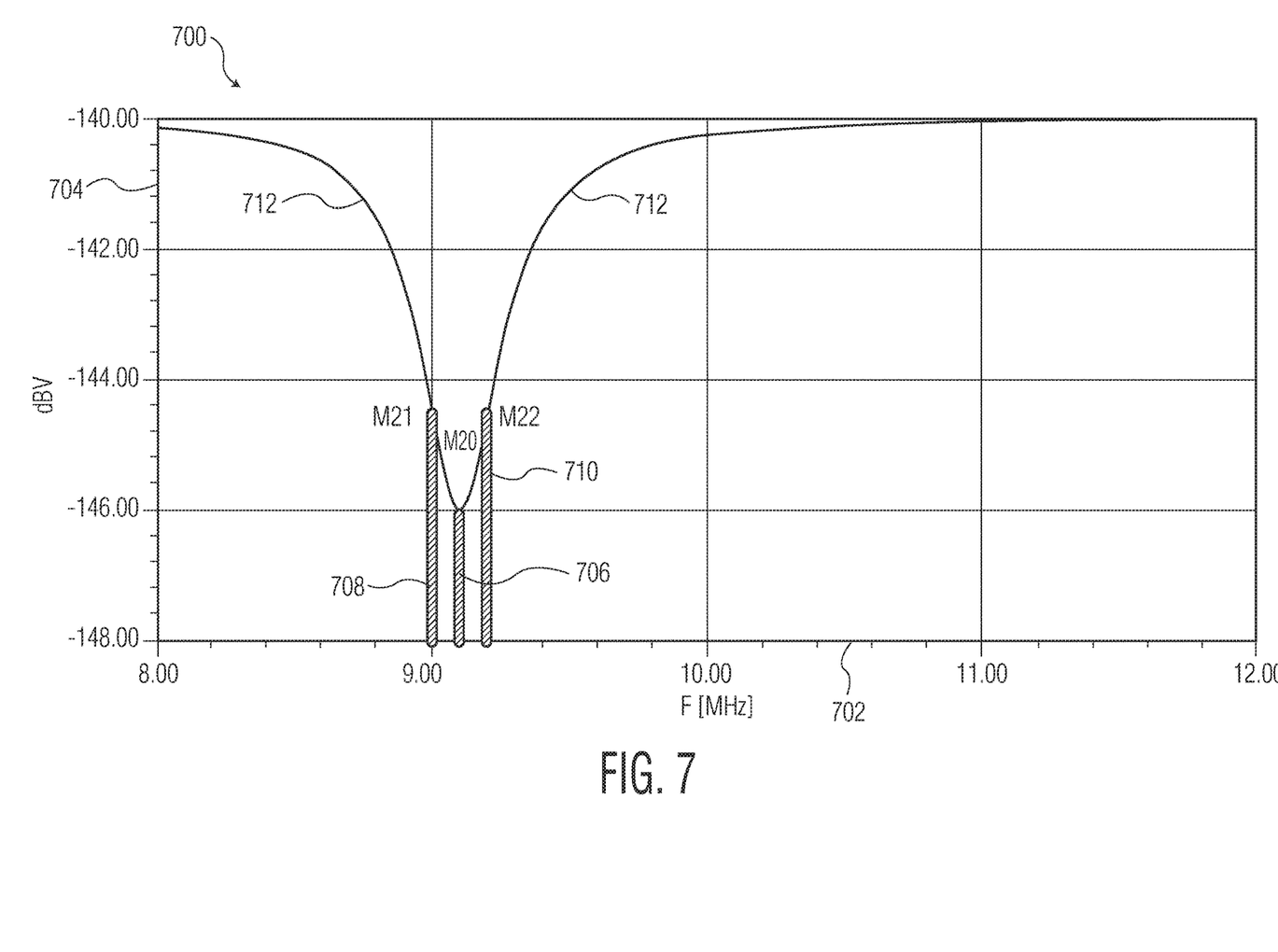
FIG. 7 is an example graph of current verses frequency for a series resonant antenna.

FIG. 7 is an example graph 700 of current verses frequency for an optimally aligned series resonant antenna. Example graph 700 shows a frequency axis 702, a current axis 704 (dBA), a first current measurement (M10) 706, a second current measurement (M11) 708, a third current measurement (M12) 710, and a transceiver 302 antenna 304 resonant envelope 712.

In this example, the controller 306 is again configured to sequentially inject three different frequencies (M20, M21 and M22) into the transceiver 302. The source current for the antenna 304 is sequentially measured, the currents belonging to the measurements M20, M21 and M22.

When the antenna 304 is completely aligned, as shown in FIG. 7, M20 shows a minimum current that belongs to the resonance frequency of the antenna 304. M21 and M22 are separated by a frequency offset of each 100 KHz from M20.

The alignment reactance, for example a variable capacitor, is set for M21 and M22 having a same sign (relative to M20) and within a certain tolerance of each other. The tolerance is determined by measuring accuracy that is feasible and alignment time. For example, the tolerance is within +/−1 dB. Use of these antenna source current measurements permits alignment of the transceiver 302 antenna 304 path, whereas such alignment would be difficult if not improbable to attain using the voltage peak detector 108 of FIG. 1 since many series resonant antenna example embodiments have no output voltage at their resonance.

As mentioned in FIG. 3, while FIGS. 4, 5, 6 and 7 present example embodiments using three frequencies, other example embodiments could have just two frequencies or one frequency.

For two frequency embodiments, just the two offset frequencies can be used and set as approximately equal or with a slight offset depending upon the antenna 304 transceiver 302 combination's channel characteristics.

For one frequency embodiments, a magnitude of the injected frequency (e.g. perhaps just the center band reference frequency) can be compared to an expected magnitude when the antenna 304 transceiver 302 combination is in a properly configured resonant state.

Using the antenna source current tuning techniques presented above, various antennas can be tuned more quickly, can minimize the antenna 304 drive currents, and/or reduce power consumption of the transceiver 302. An absence of harmonics at the antenna 304 that would tend to interfere with digital or analog signal transmissions is an added benefit.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are affected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. An antenna tuning device, comprising:
a controller configured to be coupled to a transceiver having an antenna tuner;
wherein the transceiver is coupled to an antenna;
wherein the controller is configured to receive a measured current signal from the transceiver corresponding to a current sent to or received by the antenna;
wherein the controller is configured to change an impedance of the antenna tuner in response to the measured current signal;
wherein the controller is configured to transmit a test signal to the antenna;
wherein the measured current signal received by the controller is based on the test signal; and
wherein the controller is configured to change the impedance of the antenna tuner if the measured current signal does not equal a predetermined current.

2. The device of claim 1:
wherein the transceiver includes an amplifier and the measured current signal corresponds to at least one of: a current received by the amplifier, a current internal to the amplifier, or a current output by the amplifier.

3. The device of claim 1:
wherein the transceiver is configured to receive from the antenna or transmit to the antenna a communications signal; and
wherein the controller is configured to optimize transmission or reception of the communications signal in response to the measured current signal.

4. The device of claim 1:
wherein the transceiver is configured to receive from the antenna or transmit to the antenna a communications signal; and
wherein the controller is configured to center the communications signal about a resonant frequency of the antenna by changing the impedance of the antenna tuner in response to the measured current signal.

5. The device of claim 1:
wherein the controller is configured to transmit a test signal to the antenna;
wherein the measured current signal received by the controller is based on the test signal; and
wherein the controller is configured to not change the impedance of the antenna tuner if the measured current signal equals a predetermined current.

6. The device of claim 5:
wherein the antenna has a parallel topology and the predetermined current is a maximum current.

7. The device of claim 5:
wherein the antenna has a series topology and the predetermined current is a minimum current.

8. The device of claim 1:
wherein the controller is configured to transmit two test signals at two different frequencies to the antenna;
wherein two measured current signals are received by the controller corresponding to the two test signals; and
wherein the controller is configured to change the impedance of the antenna tuner if the two measured current signals are not substantially equal.

9. The device of claim 1:
wherein the antenna has a parallel topology and a resonant frequency;
wherein the controller is configured to transmit a test signal at the resonant frequency and a test signal offset from the resonant frequency; and
wherein the controller is configured to change the impedance of the antenna tuner if a measured current of the offset test signal is either equal to or greater than a measured current of the resonant frequency test signal.

10. The device of claim 1:
wherein the antenna has a series topology and a resonant frequency;
wherein the controller is configured to transmit a test signal at the resonant frequency and a test signal offset from the resonant frequency; and
wherein the controller is configured to change the impedance of the antenna tuner if a measured current of the offset test signal is either equal to or less than a measured current of the resonant frequency test signal.

11. The device of claim 1:
wherein the antenna has a resonant frequency;
wherein the controller is configured to transmit a first test signal at the resonant frequency, a second test signal having a frequency greater than the resonant frequency, and a third test signal having a frequency less than the resonant frequency;
wherein three measured current signals are received by the controller corresponding to the three test signals; and
wherein the controller is configured to change the impedance of the antenna tuner if the measured current signals from the second and third test signals are not substantially equal.

12. The device of claim 1:
wherein the antenna is at least one of: a near field antenna, a wireless antenna, or an RF antenna.

13. The device of claim 1:
wherein the antenna tuner includes a variable reactance; and
wherein the controller is configured to change the variable reactance of the antenna tuner in response to the measured current signal.

14. The device of claim 1:
further comprising a current sensor configured to measure the current sent to or received by the antenna; and
wherein the controller is configured to receive the measured current signal from the current sensor.

15. The device of claim 1:
wherein the measured current signal corresponds to an antenna source current.

16. The device of claim 1:
wherein the antenna tuning device is embedded within at least one of: an earbud, a hearing aid, a smart watch, a body network devices, or a medical device.

17. A parallel topology antenna device, comprising:
a controller configured to be coupled to a transceiver having an antenna tuner;
wherein the transceiver is coupled to an antenna;
wherein the controller is configured to receive a measured current signal from the transceiver corresponding to a current sent to or received by the antenna;
wherein the controller is configured to change an impedance of the antenna tuner in response to the measured current signal;
wherein the antenna has a resonant frequency;
wherein the controller is configured to transmit a test signal at the resonant frequency and a test signal offset from the resonant frequency; and
wherein the controller is configured to change the impedance of the antenna tuner if a measured current of the offset test signal is either equal to or greater than a measured current of the resonant frequency test signal.

18. A series topology antenna device, comprising:
a controller configured to be coupled to a transceiver having an antenna tuner;
wherein the transceiver is coupled to an antenna;
wherein the controller is configured to receive a measured current signal from the transceiver corresponding to a current sent to or received by the antenna;
wherein the controller is configured to change an impedance of the antenna tuner in response to the measured current signal;
wherein the antenna has a resonant frequency;
wherein the controller is configured to transmit a test signal at the resonant frequency and a test signal offset from the resonant frequency; and
wherein the controller is configured to change the impedance of the antenna tuner if a measured current of the offset test signal is either equal to or less than a measured current of the resonant frequency test signal.

19. An antenna tuning device, comprising:
a controller configured to be coupled to a transceiver having an antenna tuner;
wherein the transceiver is coupled to an antenna;
wherein the controller is configured to receive a measured current signal from the transceiver corresponding to a current sent to or received by the antenna;
wherein the controller is configured to change an impedance of the antenna tuner in response to the measured current signal;
wherein the controller is configured to transmit a test signal to the antenna;

wherein the measured current signal received by the controller is based on the test signal; and wherein the controller is configured to not change the impedance of the antenna tuner if the measured current signal equals a predetermined current.

* * * * *